(No Model.) 2 Sheets—Sheet 1.

T. G. MANDT.
JUMP SEAT VEHICLE.

No. 346,760. Patented Aug. 3, 1886.

WITNESSES
F. L. Ourand
Edward Stanton

Targe G. Mandt
INVENTOR.
By Louis Bagger & Co.
Attorneys.

(No Model.) 2 Sheets—Sheet 2.
T. G. MANDT.
JUMP SEAT VEHICLE.
No. 346,760. Patented Aug. 3, 1886.
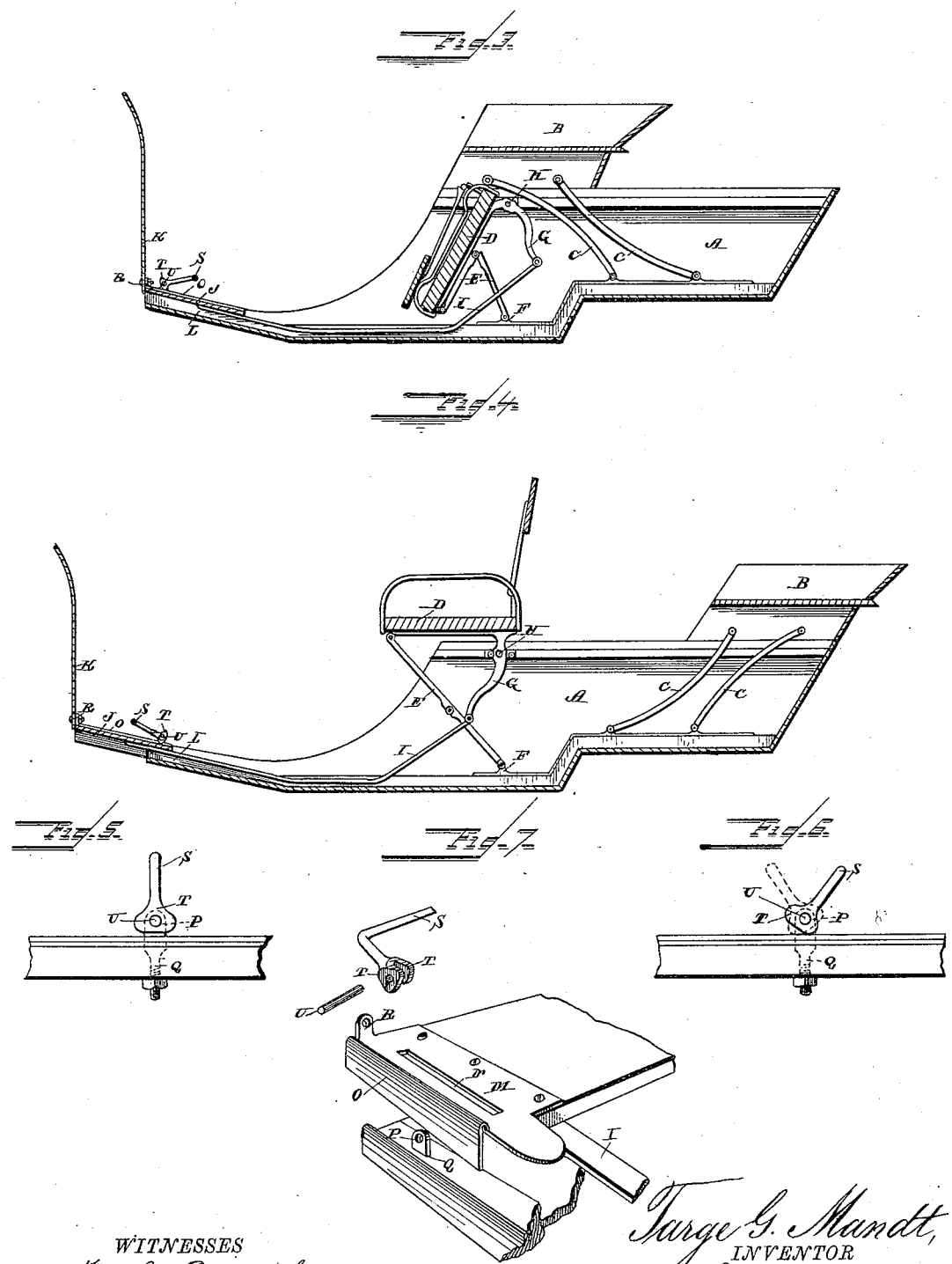
WITNESSES
F. L. Ourand
Edward Stanton
Targe G. Mandt,
INVENTOR
By Louis Bagger & Co
Attorneys.

UNITED STATES PATENT OFFICE.

TARGE G. MANDT, OF STOUGHTON, WISCONSIN.

JUMP-SEAT VEHICLE.

SPECIFICATION forming part of Letters Patent No. 346,760, dated August 3, 1886.

Application filed June 7, 1886. Serial No. 204,387. (No model.)

*To all whom it may concern:*

Be it known that I, TARGE G. MANDT, a citizen of the United States, and a resident of Stoughton, in the county of Dane and State of Wisconsin, have invented certain new and useful Improvements in Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1:
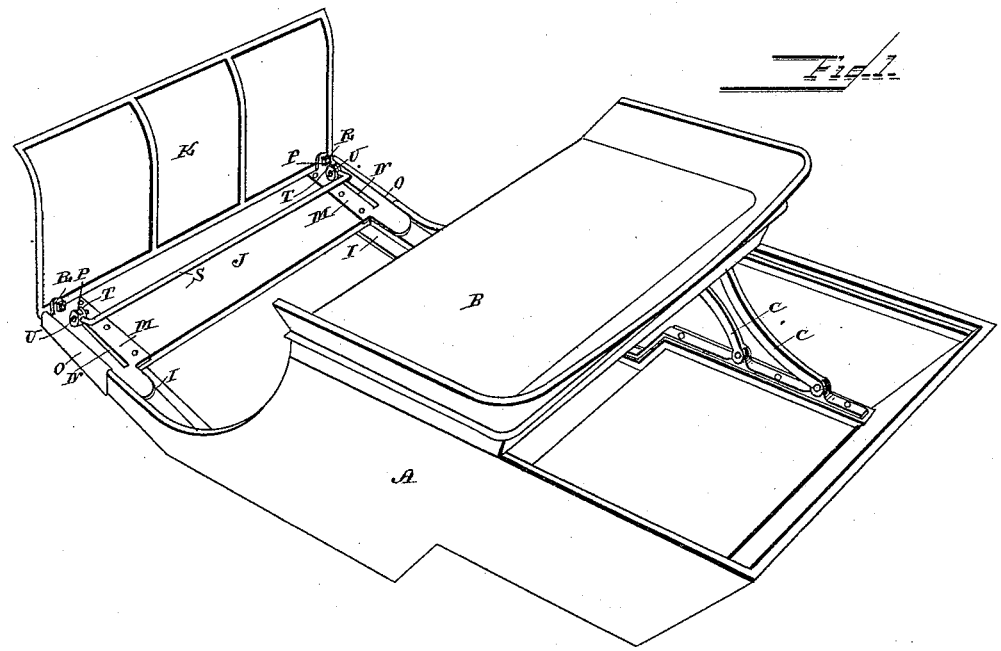
Figure 2:
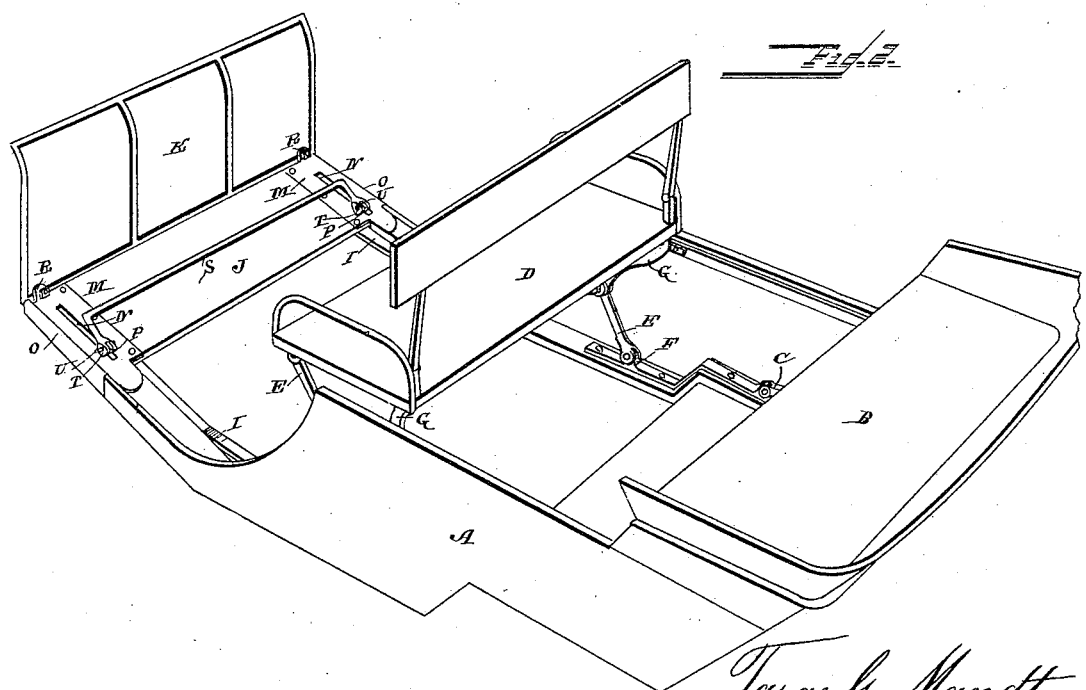

Figure I is a perspective view, seen from above, of the body of a buggy provided with my improvement. Fig. II is a similar view showing the body extended and both seats raised. Fig. III is a longitudinal vertical sectional view of the body, as shown in Fig. I. Fig. IV is a similar view of the body, as shown in Fig. 2. Figs. V and VI are detail views of the tilting and locking foot-rail; and Fig. VII is a perspective detail view of the slotted plate of the extension, and of a portion of the bottom of the body and one end of the foot-rail, showing the parts detached.

Similar letters of reference indicate corresponding parts in all the figures.

My invention has relation to that class of buggies or similar vehicles provided with so-called "jump-seats" or tilting seats, by means of which the vehicle may be arranged with one or two seats; and it consists in the improved construction and combination of parts of such a vehicle, as hereinafter more fully described and claimed.

In the accompanying drawings, the letter A indicates the body of the vehicle, which body is shaped similar to the bodies of the one-seat buggies now in use, and B indicates the main seat, which is used when the body is used with one seat only, and which is tilted back to form the back seat, being supported upon two pairs of curved arms, C, pivoted at their lower ends to the bottom of the buggy and at their upper ends to the under side of the seat. The front seat, D, has its forward edge supported by two rule-jointed legs, E E, pivoted to the under side of the seat near the front edge, and pivoted at their lower ends to ears F in the bottom of the body, the said legs standing rearwardly-inclined and folding rearward or upward.

The rear edge of the under side of the seat is provided with two arms, G, projecting downward and slightly curved forward, and these arms are pivoted near their upper ends upon bolts H to the sides of the body, allowing the seat to be tilted downward with its forward edge. The upwardly-inclined rear ends of two sliding bars, I, are pivoted to the ends of the curved arms, and have their forward ends secured to the sliding extension J, having the dash K, so that the said extension will be forced forward when the seat is folded up and the lower end of the curved arms consequently tilted forward. The ends of the extension slide in the longitudinal frame L L of the bottom of the body, and the ends are provided with plates M, secured to them and formed with longitudinal slots N, and with a doubled and downwardly-projecting outer flange, O, which will ride upon and project over the outside of the side flange of the front end of the body. The flat perforated heads P of nutted bolts Q project through the slots in the plates, being secured in the frame, and the extension may slide with its slotted plates upon the body-sill and the flat-headed bolts. The forward ends of the flanges and slotted plates are provided with upwardly-bent ears R, to which the dash is secured, and the foot-rail S has its bent ends formed each with two perforated lips, T T, with which it is pivoted to the perforated flat heads of the bolts upon pins U rocking to both sides. The perforated lips of the foot-rail are preferably triangularly eccentric, so that the eccentric portions may bear against the upper sides of the plates when the foot-rail is tilted either forward or back, holding the said plates firmly in position, while the plates may slide freely with their slots upon the bolts when the rail is tilted in an upright position. It will thus be seen that when the forward seat is raised the sliding operating-bars will force the extension forward, the slots and the flanges of the plates upon the ends of the extension guiding the same, and when the seat is entirely raised and the extension forced out to its full extent the foot-rail may be tilted, locking the extension in place, and thus at the same time holding the seat in place, preventing its being tilted down. By having the extension connected to the tilting seat the extension will be automatically operated by the seat, and it will be seen that while the buggy will only have the appearance of a one-seat buggy when the forward seat is tilted down and hidden by the main seat, which is tilted over it, the buggy will assume the appearance and give the comfort of a long two-seat buggy as soon as the seat is tilted up. It follows that the extension may be employed without having the connection to the front seat, and numerous changes may be made in the construction without departing from the spirit of my invention.

Having thus described my invention, I claim and desire to secure by Letters Patent of the United States—

1. In a buggy or similar vehicle, the combination of the body having side cleats upon its foot-board, with an extension having guide-plates sliding upon the side cleats, and having the dash secured upon its forward edge, the said extension sliding with its ends between the side cleats, as and for the purpose shown and set forth.

2. In a buggy or similar vehicle, the combination of the foot-board having side cleats and side flanges, eye bolts upon said cleats, cam-headed levers pivoted to said eye bolts, an extension sliding with its ends between the cleats, and having longitudinally slotted plates sliding with the slots upon said bolts, and having their outer edges folded down to form guide-flanges, and having the dash secured to the forward edge, as and for the purpose shown and set forth.

3. In a buggy or similar vehicle, the combination of the foot-board having the side cleats and side flanges, flat-headed perforated guide-bolts secured in the cleats, an extension sliding with its ends between the cleats, longitudinally-slotted plates upon the ends of the extension sliding with their slots upon the flat-headed bolts, and having doubled and downwardly-projecting side flanges sliding upon the side flanges of the foot-board, and having the dash secured to the forward edges, and a foot-rail having eccentric perforated lips at its bent ends pivoted upon the flat-headed bolts for locking the extension, as and for the purpose shown and set forth.

4. In a buggy or similar vehicle, the combination of a seat having rule-jointed legs for supporting its forward edge, and provided at its rear edge with downwardly-projecting curved arms pivoted near their upper ends upon the inner sides of the sides of the vehicle-body, a sliding extension upon the foot-board, and bars having their forward ends secured to the extension, and having their rear portions bent upward and pivoted at the ends to the ends of the curved arms, as and for the purpose shown and set forth.

5. In a buggy or similar vehicle, the combination of a seat pivoted near the rear edge, and having downwardly-projecting arms, a sliding extension having slotted plates sliding upon flat-headed bolts, bars secured to the extension and pivoted to the lower ends of the arms of the seat, and a foot-rail having eccentric perforated lips pivoted upon the flat-headed bolts, as and for the purpose shown and set forth.

In testimony that I claim the foregoing as my own I have hereunto affixed my signature in presence of two witnesses.

TARGE G. MANDT.

Witnesses:
 BENSON E. WAIT,
 THORVALD C. LUND.